United States Patent Office 3,108,877
Patented Oct. 29, 1963

3,108,877
TEA PRODUCT AND METHOD OF
MAKING THE SAME
Hugh S. Cooper, Shaker Heights, Ohio, assignor to Rand Development Corporation, Cleveland, Ohio, a corporation of Ohio
No Drawing. Filed Dec. 3, 1959, Ser. No. 856,945
11 Claims. (Cl. 99—76)

This invention relates to the making of beverages and more particularly to a beverage from tea leaves.

As is well known to those versed in the art, tea is ordinarily made by placing a desired quantity of tea leaves in boiling water and allowing it to steep. After a certain length of time the liquid is removed from the leaves either by decanting, straining, or, if a tea bag is used by removing the tea bag. The resulting fluid is a clear, amber fluid of pungent aroma and highly palatable to the taste.

There are not ordinarily any commonly recognized problems in connection with tea prepared in this manner, although there is a problem, not usually recognized, that limits the use of the beverage.

One of the principal ingredients of such a beverage is tea tannin, most commonly referred to as tannic acid. Of the water soluble ingredients in tea leaves, tannic acid is predominant, being present in an amount of approximately 25%. The ingredients providing the flavor are usually considered to be the amino acids, gummy matter and sugars and other substances, known to those familiar with the product.

The tannic acid is undesirable because it has a severe astringent action on the digestive tract, being classed medically as a gastric irritant.

It is therefore desirable to remove the effect of the tannic acid from the beverage and thus avoid the resulting indigestion which occurs, and still retain the flavor, aroma and stimulating effect of the tea.

Although tea is ordinarily thought of as being a hot drink it is also very popular as a cold drink, where the beverage is greatly reduced in temperature. Thus it is particularly desirable to have so-called "iced tea" particularly as a hot weather drink, since it not only has a cooling effect but also is a desirable stimulant.

One of the problems has been that as the tea, brewed as stated above, is cooled, it loses its desirable clearness and becomes turbid, and, the cooler it gets, the more turbid it becomes. The turbidity is also increased when lemon is used as a flavoring, which is a common practice. The turbidity also increases after standing in the refrigerator. It is therefore common practice, in making iced tea, to pour the hot tea over cubes of ice and to thus cool the tea which has less turbidity, but which turbidity increases as the beverage stands and gets cooler and is greatly increased when a small amount of lemon juice is added.

The last mentioned process is objectionable because in the first place it is wasteful. If the tea could be made, allowed to stand at room temperature until it was cool, and then added to the ice cubes, the process would be much more efficient and would also conserve the ice cubes, which are relatively expensive and what is more important are not usually present in sufficient quantity to supply the demand.

Not the least in importance is the fact that the character of the tea changes as to strength. A tea that is of the proper strength when first poured over the ice cubes gradually decreases in strength as the ice cubes melt with the result that the last of the tea becomes a weak and unpalatable substance due to its weakness and is still further rendered unpalatable due to the change in color and increase in turbidity. All the time it retains its undesirable effect upon digestion.

Finally, there is still another effect which comes about as the result of the increase in turbidity and that is it militates against providing a carbonated beverage made of tea. A carbonated beverage is simple to make since it only requires adding under pressure $CO_2$ to the beverage. However, in order to keep the $CO_2$ in solution after a bottle is opened, the beverage must be cool. The actual cooling again increases the turbidity and the result is an unsightly milky looking tea the physiological effect of which prevents the same from becoming popular.

It is therefore an object of my invention to provide an infusion of tea which will not become turbid upon cooling.

It is another object of my invention to provide a tea where the undesirable effects of the presence of tannic acid are eliminated.

It is another object of my invention to provide a method of making tea whereby the tannic acid is removed without changing the flavor of the tea.

Another object of my invention is to provide a tea drink which may stand for long periods of time without deterioration.

Another object of my invention is to provide a tea which may be made into a carbonated beverage.

Another object of my invention is to provide a tea which instead of upsetting digestion, acts as an aid to digestion.

Still other objects of the invention and the invention itself will become more apparent from the following description thereof.

Briefly, my invention comprises the removal of the tannic acid from an infusion of tea by precipitation.

More specifically I have found that certain substances can be added to the tea, while it is being brewed and which, when the tea is cooled, cause the tannic acid to be taken out of the solution as a flocculent precipitant which may be readily filtered. I have further found that if the tea is cooled to very low temperature the greatest amount of precipitation occurs and that if filtering is effected at this temperature, so long as the tea is not subsequently reduced to a lower temperature, it will remain a clear solution. Therefore cooling may be effected at the lowest temperature above freezing but need not necessarily be at such a low temperature providing subsequently its use is at a temperature at or above that at which it was filtered.

Although the tannin may be precipitated by the addition of substances such as albumen or gelatine, a substance which I have discovered to be most effective is papain. When gelatine is added to the tea liquor the precipitate is muddy, does not settle out readily and gives a cloudy liquor even upon filtering. Albumen on the other hand is quite similar to papain in its action and so may be used as a partial substitute for this enzyme, especially to remove the bulk of the tannin and thus lower the cost of processing.

For example, the tea beverage may be produced in a somewhat lower cost by first precipitating a large part of the tannin with albumen and/or gelatine, after which the papain is added to complete the precipitation of the tannin as well as to leave some excess, if desired, in the finished product to aid in digestion and as an additional flavoring substance. As is well known papain is an enzyme removed from the tropical papaya fruit. The use of the material as an aid to digestion is well known to the medical profession as well as to the public. It has the advantage that it acts equally well in digestive tracts which are either in acid or alkaline condition and is therefore to be preferred to pepsin or pancreatin, and adds another desirable flavor to the product.

I have found by experiment that if papain is added to the tea when it is being brewed, that as the tea cools a flocculent precipitate is formed, which precipitation becomes more complete as the tea is cooled toward the freezing point. The tea so made may be filtered when it is cooled the desired amount and only the clear liquid remains.

As a more exact example of how the tea of my invention, but not by way of limitation because various departures from the following disclosure may be made without departing from the teaching of the basic concept, I proceed as follows:

One gallon of water is heated to the boiling point. To this I add about two ounces of tea leaves. After the mixture has steeped for about five minutes, it is strained. At this point lemon or lime juice may be added in the desired amounts to suit the taste. It will be appreciated that these materials, lemon or lime juice, are only added when the particular flavor thereof is desired, and, that in event tea without such flavoring is desired, they are omitted. Other types of flavoring may be used such as citric acid and essence of lemon or lime. As an example, five to ten grams per gallon of citric acid may be used and the essence of lemon or lime at the rate of ½ cc. per gallon.

Sugar or other sweetening agents, such as saccharin, is then added to suit the taste, or may be omitted if unsweetened tea is desired.

Then the papain is added, about 1 to 2 grams of the enzyme per gallon of tea has proved to be satisfactory. More may be added, it being desirable to provide a sufficient quantity to cause precipitation of all or most of the tannin and in some instances slightly more for reasons hereinafter to become more apparent.

It will be noted that when the juice of the citrus fruits, or citric acid, is added there will be a slight precipitate. After the papain is added the precipitate becomes quite bulky and flocculent in nature, settling rather rapidly and sharply. Upon the addition of the papain the liquid is vigorously stirred until all of the papain is dissolved.

The above liquid is then allowed to cool at room temperature after which it is cooled to about 30–50° F., where it is held for several hours. It should be pointed out that the cooling may be expedited in any well known manner to those versed in the art, such as by use of any of the well known heat exchangers in combination with a suitable refrigerating medium.

The liquid is then filtered while being held at a low temperature, usually between 34 to 35 degrees, preferably just above freezing or at least as low as the lowest temperature at which the subsequent filtrate is being stored or used. The filtrate is amber in color, clear and still retains its original aroma and taste.

The liquid may now be served as it is, preferably with a small amount of ice in a glass to keep it cool and to provide the physiological effect upon the drinker.

It may also be kept and heated to provide hot tea or it may be evaporated to provide a dry powder which may be subsequently used as any of the so-called "instant teas."

In accordance with the present invention, a preferred method of making tea is one that comprises adding two to three ounces of tea leaves to a gallon of boiling water, allowing the tea to steep for three to six minutes, removing the tea leaves from the hot solution, adding one to two grams of papain enzyme and 5 to 10 grams of citric acid to the hot solution and stirring until dissolved, allowing the solution to cool to room temperature, cooling the solution to 33 to 36° F., and then filtering the solution at said temperature of 33 to 36° F. to remove the precipitate.

One particular use of the product is to carbonate the same and bottle the carbonated tea. Thus the bottled tea may be transported from place to place, put in a suitable cooler and served from the bottles straight or used in combination with liquors or alcoholic beverages if desired.

I also contemplate that the tea as prepared prior to carbonating may be concentrated to provide a liquid concentrate and subsequently used by the addition of carbonated water to provide a carbonated drink.

As I previously stated, papain may be used in excess of the amount to provide complete precipitation of the tannin. If such is the case a drink is provided having a highly therapeutic value due to the excess of papain remaining in the liquid for persons with so-called upset stomachs or digestive disturbances. Thus a person may obtain the stimulating and invigorating effect of the tea, without any of the undesirable effects of the tannin, and with a noticeable improvement, if not complete elimination of the digestive disturbances and an aid to digestion.

Thus, I have provided an improved beverage which has all of the aroma, and pungent odor of tea, with all of the stimulating and invigorating properties and including a therapeutic value not ordinarily found in any of the more desirable beverages. I also have provided a tea which may be brewed and kept for long periods prior to its use without deterioration and which may be cooled to any desired temperature without losing its clearness.

If the tea is made without the addition of the citrus fruit or essences stated, a slice of lemon may be provided at the time of serving, and the addition thereof to the tea prepared as I have set forth will not reduce its clearness.

Having thus described my invention, in an embodiment thereof, I am aware that numerous and extensive departures may be made therefrom without departing from the spirit of my invention as defined in the appended claims.

I claim:

1. The method of making tea which comprises adding two to three ounces of tea leaves to a gallon of boiling water, allowing the tea to steep for three to six minutes, removing the tea leaves from the hot solution, adding one to two grams of papain enzyme and 5 to 10 grams of citric acid to the hot solution and stirring until dissolved, allowing the solution to cool to room temperature, cooling the solution to 33 to 36 degrees F., and then filtering the solution at said temperature of 33 to 36° F. to remove the precipitate.

2. The method of making tea according to claim 1 after which the solution is carbonated and bottled.

3. The method as described in claim 1 wherein a flavoring agent is added to the tea while it is hot.

4. A method of making a tea drink comprising the steps of leaching tea leaves in water to provide an infusion of tea, mixing papain with said infusion, cooling said infusion to a temperature of about 33 to 36° F. to form a protein-tannate precipitate, separating said precipitate from the infusion at said temperature of 33 to 36° F. to provide a delicious tea drink that is stable and storable for long periods of time without becoming cloudy.

5. A method of making a tea drink comprising the steps of leaching tea leaves in hot water to provide an infusion of tea, mixing papain with said infusion to dissolve the papain and provide a solution thereof in the tea infusion, cooling said solution to room temperature to form a precipitate of protein-tannate material, cooling said solution to a temperature of 33 to 36° F. and filtering said solution at about 33 to 36° F. to remove the precipitate and provide a delicious tea drink that is storable for a long period of time without forming a turbid precipitate.

6. A method of making a tea drink comprising the steps of leaching tea leaves in hot water to provide an infusion of tea, mixing papain and an acid flavoring agent with said infusion to dissolve the papain and provide a solution thereof in the tea infusion, cooling said solution to room temperature to form a precipitate of protein-tannate material, cooling said solution to a temperature of 33 to 36° F. and filtering said solution at about 33 to 36° F. to remove the precipitate and provide a delicious tea drink that is storable for a long period of time without forming a turbid precipitate.

7. A method of making a tea drink comprising the steps of leaching tea leaves in hot water to provide an infusion of tea, mixing papain and citric acid with said infusion to dissolve the papain and provide a solution thereof in the tea infusion, cooling said solution to room temperature to form a precipitate of protein-tannate material, cooling said solution to a temperature of 33 to 36° F. and filtering said solution at about 33 to 36° F. to remove the precipitate and provide a delicious tea drink that is storable for a long period of time without forming a turbid precipitate.

8. A method of making a tea drink comprising the steps of leaching tea leaves in hot water to provide an infusion of tea, mixing papain, citric acid and essence of lemon juice with said infusion to dissolve the papain and provide a solution thereof in the tea infusion, cooling said solution to room temperature to form a precipitate of protein-tannate material, cooling said solution to a temperature of 33 to 36° F. and filtering said solution at about 33 to 36° F. to remove the precipitate and provide a delicious tea drink that is storable for a long period of time without forming a turbid precipitate.

9. A method of making a tea drink comprising the steps of leaching tea leaves in hot water to provide an infusion of tea, mixing papain, citric acid and essence of lime juice with said infusion to dissolve the papain and provide a solution thereof in the tea infusion, cooling said solution to room temperature to form a precipitate of protein-tannate material, cooling said solution to a temperature of 33 to 36° F. and filtering said solution at about 33 to 36° F. to remove the precipitate and provide a delicious tea drink that is storage for a long period of time without forming a turbid precipitate.

10. The method of making tea which comprises adding two or three ounces of tea leaves to a gallon of boiling water, allowing the tea to steep for three to six minutes, removing the tea leaves from the hot solution, adding one to two grams of papain enzyme and five to ten grams of citric acid and about ½ cc. of essence of lemon juice to the hot solution and stirring until dissolved, allowing the solution to cool to room temperature, cooling the solution to 33 to 36° F., and then filtering the solution at said temperature of 33 to 36° F.

11. A tea product made by the method defined in claim 5.

References Cited in the file of this patent

UNITED STATES PATENTS

| | | |
|---|---|---|
| 352,809 | Davidson | Nov. 16, 1886 |
| 726,102 | Roger | Apr. 21, 1903 |
| 1,764,955 | Heuser | June 17, 1930 |
| 1,854,062 | Potter et al. | Apr. 12, 1932 |
| 2,325,370 | Chutjian | July 27, 1943 |
| 2,433,411 | Wallerstein | Dec. 30, 1947 |
| 2,860,987 | Werner | Nov. 18, 1958 |

FOREIGN PATENTS

| | | |
|---|---|---|
| 20,527 | Great Britain | of 1897 |